(12) United States Patent
Dayan et al.

(10) Patent No.: US 7,444,517 B2
(45) Date of Patent: Oct. 28, 2008

(54) METHOD FOR PROTECTING A USER'S PASSWORD

(75) Inventors: Richard Alan Dayan, Raleigh, NC (US); Jeffery Bart Jennings, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 842 days.

(21) Appl. No.: 10/860,363

(22) Filed: Jun. 3, 2004

(65) Prior Publication Data

US 2005/0273625 A1    Dec. 8, 2005

(51) Int. Cl.
  *H04K 1/00*     (2006.01)
(52) U.S. Cl. .......................... 713/184; 713/182; 726/1; 726/2; 726/22; 726/26
(58) Field of Classification Search ........................ None
  See application file for complete search history.

(56) References Cited

U.S. PATENT DOCUMENTS

| | | | | |
|---|---|---|---|---|
| 5,276,314 | A | 1/1994 | Martino et al. | 235/380 |
| 6,006,334 | A | 12/1999 | Nguyen et al. | 713/202 |
| 6,021,203 | A | 2/2000 | Douceur et al. | 380/49 |
| 6,212,285 | B1 | 4/2001 | Bender et al. | 382/100 |
| 6,230,269 | B1 | 5/2001 | Spies et al. | 713/182 |
| 6,263,439 | B1 | 7/2001 | Hondros et al. | 713/182 |
| 6,567,919 | B1 | 5/2003 | Yanagihara et al. | 713/201 |
| 6,954,862 | B2 * | 10/2005 | Serpa | 726/5 |

FOREIGN PATENT DOCUMENTS

| | | |
|---|---|---|
| JP | 63-143667 | 6/1988 |
| JP | 2000-99801 | 4/2000 |
| JP | 2000-172638 | 6/2000 |

OTHER PUBLICATIONS

Morris, Robert et. al, "Password Security: A Case History," Bell Laboratories, Murray Hill, New Jersey, Apr. 3, 1978, pp. 1-5.

* cited by examiner

*Primary Examiner*—Kambiz Zand
*Assistant Examiner*—Roderick Tolentino
(74) *Attorney, Agent, or Firm*—Sawyer Law Group LLP

(57) ABSTRACT

The present invention relates to a method for protecting a password. In a first aspect, the method includes allowing a user to enter an apparent password into a computing system, wherein the apparent password is a string of characters and keystrokes including the password and an arbitrary number of non-password related characters and keystrokes. The method further includes analyzing the string of characters and keystrokes by the computing system to find the password, and validating the apparent password if the password is found in any position in the string of characters and keystrokes. In a second aspect, the method includes creating a random pattern in response to receiving a request from a user to access a protected resource in a computing system, wherein the random pattern is associated with the request, displaying the random pattern associated with the request to the user, and allowing the user to enter an apparent password into the computing system that controls access to the protected resource, wherein the apparent password is a string of characters and keystrokes including the password, the random pattern and an arbitrary number of non-password related characters and keystrokes. The method further includes analyzing the string of characters and keystrokes by the computing system to find the password and the random pattern associated with the request, and validating the apparent password if the password and the random pattern are found in any position in the string of characters and keystrokes.

8 Claims, 3 Drawing Sheets

METHOD FOR PROTECTING A USER'S PASSWORD

FIELD OF THE INVENTION

The present invention relates to computer systems, and more particularly, to a method and system for protecting a user's password to access a computer system.

BACKGROUND OF THE INVENTION

For most computer systems, a user is required to enter a password to gain access to a computer system. Typically, the user enters the password by pressing a sequence of keys on an input device, such as a keyboard, touchpad or punchpad. The password protects the computer system and ensures that only an authorized user is allowed access. Of course, this security measure fails if the password is discovered by an intruder. For instance, the intruder can install a keystroke monitoring virus on the computer system that monitors and records the user's keystrokes and passes the recorded keystrokes to the intruder for later use. In a less sophisticated technique, the intruder can surreptitiously watch the authorized user enter the password and memorize the keystrokes. Once the intruder discovers the password, he or she can access the computer system and any data stored therein.

Accordingly, what is needed is a system and method for protecting a user's password from prying eyes and a keystroke monitoring virus. The present invention addresses such a need.

SUMMARY OF THE INVENTION

The present invention relates to a method and system for protecting a password. In a first aspect, the method includes allowing a user to enter an apparent password into a computing system, wherein the apparent password is a string of characters and keystrokes including the password and an arbitrary number of non-password related characters and keystrokes. The method further includes analyzing the string of characters and keystrokes by the computing system to find the password, and validating the apparent password if the password is found in any position in the string of characters and keystrokes. In a second aspect, the method includes creating a random pattern in response to receiving a request from a user to access a protected resource in a computing system, wherein the random pattern is associated with the request, displaying the random pattern associated with the request to the user, and allowing the user to enter an apparent password into the computing system that controls access to the protected resource, wherein the apparent password is a string of characters and keystrokes including the password, the random pattern and an arbitrary number of non-password related characters and keystrokes. The method further includes analyzing the string of characters and keystrokes by the computing system to find the password and the random pattern associated with the request, and validating the apparent password if the password and the random pattern are found in any position in the string of characters and keystrokes.

Through the first aspect of the present invention, obfuscation of keystrokes associated with a password is based on the fact that humans are typically unable to memorize long strings of random numbers and/or characters. By allowing the user to enter an apparent password including a string of non-password related alphanumeric characters along with the password, the likelihood of an intruder memorizing each keystroke is significantly reduced if not eliminated.

In the second aspect of the present invention, the keystroke obfuscation method includes generating a random pattern for each request to access a protected system or data and appending the random pattern to the apparent password to form a modified apparent password. The modified apparent password is validated only if the password and the random pattern for the request are among the alphanumeric characters entered. In this aspect, an intruder would be hard pressed to memorize the modified apparent password because of its randomness and length. Moreover, because the random pattern changes for each request, the password validation engine looks for a different password/random pattern combination for each request. Thus, a keystroke monitoring virus would be ineffective because a modified apparent password for a previous request would not be valid for a later request.

DETAILED DESCRIPTION OF THE INVENTION

The present invention relates to computer systems, and more particularly to a method and system for protecting a user's password. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. For example, although the present invention will be described in the context of a system log-in, one of ordinary skill in the art will readily recognize that the method and system can be utilized in any situation where a user is prompted to enter a password, e.g., to access a software module or sensitive data on a server. Thus, the present invention is not intended to be limited to the embodiments shown, but is to be accorded the widest scope consistent with the principles and features described herein.

According to a first aspect of the present invention, the user enters an apparent password, which includes an arbitrary number of non-password related characters along with the user's password. A password validation engine examines the apparent password and determines whether the password is among the characters entered. If it is, the apparent password is validated and the user is granted access to the computer system. In a second aspect of the present invention, the password obfuscation method includes generating a random pattern for each request to access a protected system or data and appending the random pattern to the apparent password to form a modified apparent password. The modified apparent password is validated only if the password and the random pattern for the request are among the characters entered.

Figure 1:
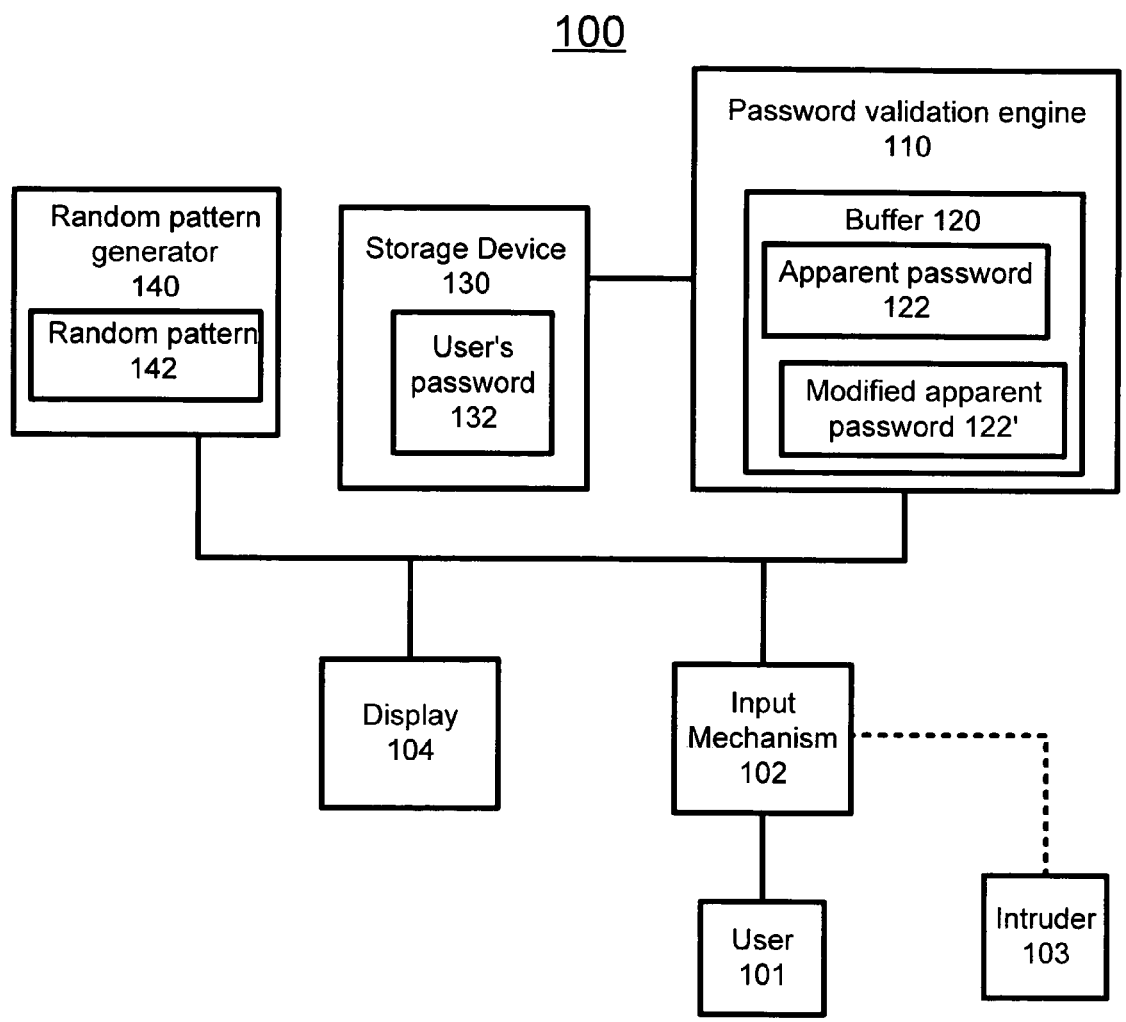
FIG. 1 is a diagram of a computer system in which the present invention can be used.

FIG. 1 is a block diagram of computing system 100 utilizing the present invention according to a preferred embodiment. The system 100 includes a storage device 130 that stores system data including password information 132, e.g., a user's password, for authorized users. In addition the system 100 includes an input mechanism 102, such as a keyboard, number pad, or mouse, singularly or in combination, through which a user 101 enters information into the system 100, and a display 104.

According to the preferred embodiment of the present invention, the system 100 includes a password validation engine 110 and a random pattern generator 140. The password validation engine 110 analyzes a password entered by the user 101 and compares it to the password information 132 stored in the storage device 130. The random pattern generator 140 creates a random pattern of characters for each request to access protected resources. The operation of the random pattern generator 140 will be described in greater detail below.

In FIG. 1, an intruder 103 is shown. In one embodiment, the intruder 103 is a person observing the user 101 as the user enters his or her password 132 in the system 100. The "observing intruder" 103 attempts to memorize the keystrokes entered by the user 101 in order to break into the system 100 at a later time. In another embodiment, the intruder 103 is a keystroke monitoring virus (referred to as a "monitoring intruder") that monitors and records the keystrokes entered by the user 101 and then retransmits the recorded keystrokes to the system to gain access to protected resources.

Figure 2:
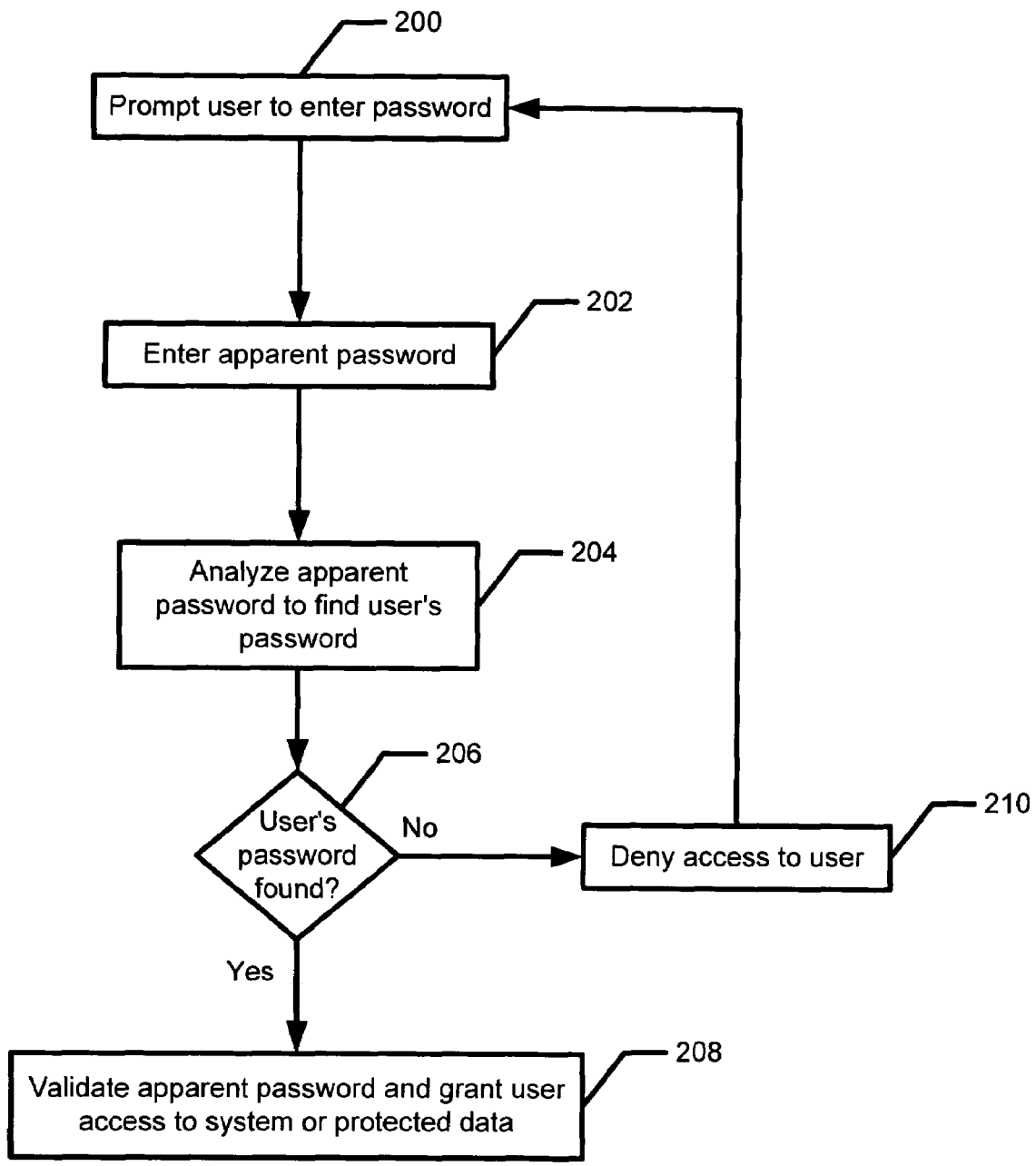
FIG. 2 is a flowchart illustrating a method for utilizing the password validation engine to protect the user's password from the observing intruder according to a preferred embodiment of the present invention.

FIG. 2 is a flowchart illustrating a method for utilizing the password validation engine 110 to protect the user's password 132 from the observing intruder 103 according to a preferred embodiment of the present invention. Referring to FIGS. 1 and 2, the process begins when the user 101 is prompted by the computing system 100 to enter his or her password 132 (step 200). The computing system 100 can prompt the user 101 for a password 132 at a system log-in when the user 101 is requesting access to the computing system 100, or when the user 101 requests access to a software module or to any sensitive information in the computing system 100.

In response to the prompt, the user 101 enters an apparent password 122 (step 202) via the input mechanism 102. According to the preferred embodiment of the present invention, the apparent password 122 is a string of characters and keystrokes that includes the user's password 132 and an arbitrary number of non-password related characters and keystrokes. The user's password 132 is buried amongst the arbitrary number of non-password related characters and keystrokes at an arbitrary position.

The minimum length of the apparent password 122 may be specified by a system administrator. In this manner, the amount of appropriate typing and level of security can be defined within the user's environment. In one embodiment, the minimum length of the apparent password 122 is the length of the user's password 132 such that the user 101 has the option of typing in the password 132 only, e.g., if the user 101 is in a secure environment, or of typing in the apparent password 122. The system 100 validates the password in either situation. In another embodiment, the minimum length of the apparent password 122 is four (4) or five (5) times longer than the user's password 132 because the longer the apparent password 122, the more difficult it becomes for the observing intruder 103 to write down or memorize the keystrokes entered by the user 101.

For example, assume the user's password 132 is "MYDOGBOB." As is, the observing intruder 103 would have little difficulty writing down or memorizing the keystrokes associated with the user's password 132. The apparent password 122, however, can be "ASDLFKJSDLFKJDSLWEOIASJV212943MYDOGBOB GHFDSKFWORULDS." The user's password 132, shown in BOLD, is buried within the apparent password 122. In practice, the user's password 132 would not be bolded. Writing down or memorizing such a sequence of characters and keystrokes is nearly, if not completely, impossible.

In a preferred embodiment, the user 101 can enter his or her password 132 at any point while the user 101 is entering the apparent password 122. In other words, the position of the user's password 132 within the apparent password 122 is user-determined. In another preferred embodiment, the user 101 can fragment his or her password 132 into two or more fragments and enter the non-password related characters and keystrokes before, after and between the two or more password fragments. The number of fragments allowed can be specified by the system administrator. For example, the user 101 can enter the following apparent password 122:

"ADLKFALSDQWEOUAMYDOG234098EADLFHASPBOBASK DFWOASK"

In yet another embodiment, the apparent password 122 includes a token delimiter immediately before and after the user's password 132 to indicate that the characters inside of the token delimiters makeup the user's password 132. For example, if the token delimiter is "TOKEN" the user 101 can enter the following apparent password 122:

"ADLFALSDFJA; LKJTOKENMYDOGBOBTOKENQEORIU4P598322"

Alternatively, a token delimiter followed by a number indicating the length of the user's password 132 can be entered immediately before the user's password 132. The token delimiter can be defined by the user 101 or the system 100. Note that in each of the preferred embodiments, the user 101 is required to enter his or her complete password 132. Accordingly, the strength of the password 132 is not weakened.

Referring again to FIG. 2, once the user 101 has entered the apparent password 122, the password validation engine 130 analyzes the apparent password 122 to find the user's password 132 (step 204). The apparent password 122 is preferably stored temporarily in a buffer 120 in the password validation engine 130. Because the password validation engine 130 is coupled to the storage device 130 and therefore, has access to the user's password 132, it can determine if the apparent password 122 includes the user's password 132.

If the password validation engine 130 finds the user's password 132 in the apparent password 122 (step 206), the password validation engine 130 validates the apparent password 122, and grants the user 101 access to the system 100 or protected data (step 208). If the user's password is not found (step 206), access is denied (step 210) and the system prompts the user 101 to enter his or her password (step 200).

In a second preferred embodiment, the intruder 103 is a keystroke monitoring virus that can intercept the apparent password 122. If the intercepted apparent password 122 is then passed to the password validation engine 130, an unauthorized user can gain access to the system 100. To protect against such an attack, the system 100 preferably stores the apparent password 122 and does not allow the same apparent password 122 to validate more than once.

In another preferred embodiment, the system 100 includes a random pattern generator 140. According to this preferred embodiment of the present invention, the random pattern generator 140 creates a random pattern of characters 142 for each password validation event, i.e., each time the user 101 is prompted to enter his or her password 132. The random pattern 142 is used to prevent the monitoring intruder 103 from breaking into the system 100.

Figure 3:
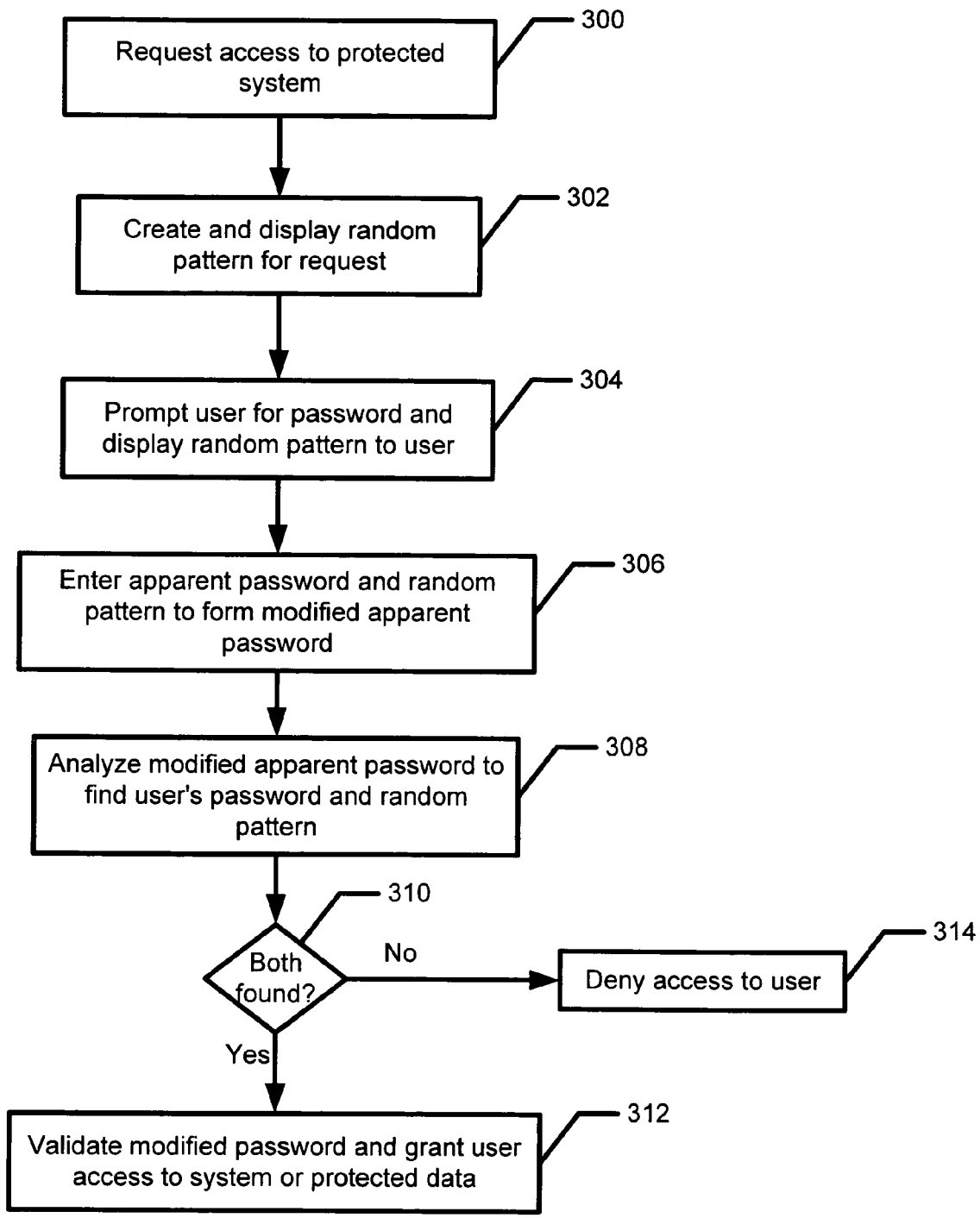
FIG. 3 is a flowchart illustrating a method for utilizing the random pattern generator to protect a user's password from a monitoring intruder according to a preferred embodiment of the present invention.

FIG. 3 is a flowchart illustrating a method for utilizing the random pattern generator 140 to protect a user's password 132 from a monitoring intruder 103 according to a preferred embodiment of the present invention. Referring to FIGS. 1 and 3, the method begins when the user requests access to the computing system 100 or to protected data in the computing system 100 (step 300). In response to such a request, the random pattern generator 140 creates and briefly displays the random pattern of characters 142 associated with the request (step 302) on the display 104. The random pattern 142 is preferably displayed in a different location on the display 104 each time. The user 101 is then prompted to enter his or her password 132 (step 304). In response to the prompt, the user 101 enters the apparent password 122 and the random pattern 142 to form a modified apparent password 122' (step 306).

Once the user 101 has entered the modified apparent password 122', the password validation engine 130 analyzes the modified apparent password 122' to find the user's password 132 and the random pattern 142 (step 308). If the password validation engine 130 finds both the user's password 132 and the random pattern 142 in the modified apparent password 122' (step 310), the password validation engine 130 validates the modified apparent password 122', and grants the user 101 access to the system 100 or protected data (step 312). If the user's password or the random pattern 142 or both, are not found, access is denied (step 314).

Because the random pattern 142 is different for each request, the modified apparent password 122' is also different for each request. The password validation engine 130, having access to both the user's password 132 and the random pattern 142 associated with the request, validates the modified apparent password 122' only if the user's password 132 and the random pattern 142 are found in the modified apparent password 122.' Accordingly, if the monitoring intruder 103 passes an intercepted modified apparent password 122' for a previous request, access will be denied because the intercepted modified apparent password 122' will not include the random pattern 142 associated with the new request.

The present invention is directed to a system and method for protecting a user's password from prying eyes and a keystroke monitoring virus. According to a first aspect of the present invention, the user enters an apparent password, which includes an arbitrary number of non-password related characters along with the user's password. Because of its length and randomness, the apparent password is extremely difficult, if not impossible, to memorize by an observer. A password validation engine examines the apparent password and determines whether the user's password is among the characters entered. If it is, the apparent password is validated and the user is granted access to the computer system. In a second aspect of the present invention, a random pattern is generated for each request to access a protected system or protected data and displayed briefly to the user. The user must include the random pattern in the apparent password to form a modified apparent password. The modified apparent password is validated only if the user's password and the random pattern for the request are among the characters entered. Because the modified apparent password is different for each request, a keystroke monitoring virus will be ineffective.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing a protectable password comprising: a) entering an apparent password into a computing system, wherein the apparent password is a string of characters and keystrokes including the protectable password and an arbitrary number of characters and keystrokes unrelated to the protectable password, entering the protectable password in any position within the string of characters and keystrokes of the apparent password; b) analyzing the entered apparent password by the computing system to determine a presence or absence of the protectable password; and c) validating the apparent password if the protectable password is determined to be present in any position in within the string of characters and keystrokes of the apparent password.

2. The method of claim 1, wherein step (a) includes: (a1) fragmenting the protectable password into a plurality of segments; (a2) entering a first segment of the protectable password; (a3) entering a string of characters and keystrokes unrelated to the protectable password; (a4) entering a next segment of the protectable password; and (a5) repeating steps (a3) and (a4) until a last segment of the protectable password has been entered.

3. The method of claim 1, wherein step (a) includes: (a1) entering a first token delimiter immediately before the protectable password; and (a2) entering a second token delimiter immediately after the protectable password.

4. The method of claim 3, wherein step (b) includes: (b1) detecting the first token delimiter in the string of the apparent password; (b2) detecting the second token delimiter in the string of the apparent password; and (b3) comparing the characters in the string of the apparent password between the first and second token delimiters with the protectable password.

5. The method of claim 3, wherein the first and second token delimiters are defined by a user.

6. A method for providing a protectable password comprising: a) creating a random pattern in response to receiving a request from a user to access a protected resource in a computing system, wherein the random pattern is associated with the request; b) displaying the random pattern associated with the request to the user; c) allowing the user to enter an apparent password into the computing system that controls access to the protected resource, wherein the apparent password is a string of characters and keystrokes including the password, the random pattern and an arbitrary number of characters and keystrokes unrelated to the protectable password, allowing the user to enter the protectable password and the random pattern in any position within the apparent password; d) analyzing the string of characters and keystrokes of the apparent password by the computing system to determine a presence or absence of the protectable password and the random pattern associated with the request; and e) validating the apparent password if the protectable password and the random pattern are determined to be present in any position within the string of characters and keystrokes of the apparent password.

7. The method of claim 6, wherein step (C) includes: (c1) allowing the user to fragment the protectable password into a plurality of segments; (c2) entering a first segment of the protectable password; (c3) entering a string of characters and keystrokes unrelated to the protectable password; (c4) entering a next segment of the protectable password; and (c5) repeating steps (c3) and (c4) until a last segment of the protectable password has been entered.

8. The method of claim 6, wherein step (c) includes: (c1) entering a first token delimiter immediately before the protectable password; and (c2) entering a second token delimiter immediately after the protectable password, wherein the first and second token delimiters are defined by the user.

* * * * *